US012506287B2

(12) United States Patent
Tseng et al.

(10) Patent No.: US 12,506,287 B2
(45) Date of Patent: Dec. 23, 2025

(54) ELECTRICAL CONNECTOR

(71) Applicant: Molex, LLC, Lisle, IL (US)

(72) Inventors: Ting Chang Tseng, New Taipei (TW); Venkatesan Manickam, Jurong Town (SG); Yi-Chen Chou, New Taipei (TW)

(73) Assignee: Molex, LLC, Lisle, IL (US)

( * ) Notice: Subject to any disclaimer, the term of this patent is extended or adjusted under 35 U.S.C. 154(b) by 482 days.

(21) Appl. No.: 17/867,698

(22) Filed: Jul. 19, 2022

(65) Prior Publication Data

US 2023/0066802 A1 Mar. 2, 2023

(30) Foreign Application Priority Data

Sep. 2, 2021 (CN) ......................... 202111026229.9

(51) Int. Cl.
*H01R 12/72* (2011.01)
*H01R 13/514* (2006.01)

(52) U.S. Cl.
CPC ......... *H01R 12/724* (2013.01); *H01R 13/514* (2013.01)

(58) Field of Classification Search
CPC ............................ H01R 13/514; H01R 12/724
See application file for complete search history.

(56) References Cited

U.S. PATENT DOCUMENTS 10,581,201 B2 * 3/2020 Hsu ...................... H01R 13/405
11,545,788 B2 * 1/2023 Lin .................... H01R 13/6471
11,652,307 B2 * 5/2023 Yue .................... H01R 13/6582 439/676
2011/0009001 A1 1/2011 Chen et al.
2015/0280375 A1 * 10/2015 Xu ......................... H01R 24/62 439/638
2021/0021075 A1 1/2021 Tan

FOREIGN PATENT DOCUMENTS

CN 111512499 A 8/2020
CN 112072400 A 12/2020
TW 201601388 A 1/2016

* cited by examiner

*Primary Examiner* — Ross N Gushi

(57) ABSTRACT

An electrical connector is provided that includes an insulative body, an upper terminal module, and a lower terminal module. The upper terminal module and the lower terminal module are provided to the insulative body. The upper terminal module includes a plurality of upper terminals and an upper insulative frame, the plurality of upper terminals include multiple upper signal terminals and at least one upper ground terminal. Each upper terminal has an upper vertical segment, an upper horizontal segment and an upper bending segment connected between the upper vertical segment and the upper horizontal segment, the upper vertical segment has a first upper held portion and an upper soldering portion, the upper horizontal segment has a second upper held portion and an upper cantilevered arm portion. The upper insulative frame has a first embedding portion which embeds the first upper held portion and a second embedding portion which embeds the second upper held portion.

19 Claims, 15 Drawing Sheets

ELECTRICAL CONNECTOR

CROSS-REFERENCE TO RELATED APPLICATION

This application claims the benefit of and priority to Chinese Patent Application No. 202111026229.9 filed on Sep. 2, 2021, which is incorporated herein by reference in its entirety.

TECHNICAL FIELD

The present disclosure relates to a connector and particularly relates to an electrical connector.

BACKGROUND

Chinese Patent Publication No. CN111512499A discloses a connector, where the connector has an upper terminal module, a lower terminal module, and a spacer which makes the upper terminal module and the lower terminal module spaced apart from each other. The spacer has a plurality of ribs which are used to make a plurality of upper terminals of the upper terminal module spaced apart from each other and hold tail portions of the plurality of upper terminals. In operation, only the plurality of ribs of the spacer are necessary to be treated by heating. The plurality of ribs of the spacer hold the tail portions of the plurality of upper terminals so as to maintain the tail portions of the plurality of upper terminals stable. However, because the plurality of ribs would generate deformation in a process that the plurality of ribs are treated by heating, it would easily cause coplanarity among tips of the tail portions of the plurality of upper terminals to become poor, which would affect a subsequent soldering operation on the tail portions, and, when there would be consistent in shape for the plurality of ribs correspondingly holding the plurality of upper terminals therebetween to cause a pitch among the plurality of upper terminals to be changed, it would be also easy to generate a risk that signal integrity of the plurality of upper terminals is affected.

SUMMARY

Therefore, one of objects of the present disclosure is to provide an electrical connector.

Accordingly, in some embodiments, an electrical connector of the present disclosure comprises an insulative body, an upper terminal module, and a lower terminal module. The upper terminal module and the lower terminal module are assembled with each other and together are provided to the insulative body. The upper terminal module includes a plurality of upper terminals and an upper insulative frame, the plurality of upper terminals include multiple upper signal terminals and at least one upper ground terminal, the multiple upper signal terminals form upper signal terminal pairs which are spaced apart from each other by the at least one upper around terminal, each upper terminal has an upper vertical segment, an upper horizontal segment and an upper bending segment which is connected between the upper vertical segment and the upper horizontal segment, the upper vertical segment has a first upper held portion, an upper extension portion which extends from the first upper held portion and an upper soldering portion which extends from the upper extension portion, the upper horizontal segment has a second upper held portion and an upper cantilevered arm portion which extends from the second upper held portion; the upper insulative frame has a first embedding portion which embeds the first upper held portions of the upper vertical segments of the plurality of upper terminals and a second embedding portion which embeds the second upper held portions of the upper horizontal segments of the plurality of upper terminals, the first embedding portion has at least one first recessed groove which corresponds to the at least one upper ground terminal in position.

In some embodiments, the first recessed groove extends to a surface of the first upper held portion of the upper ground terminal.

In some embodiments, the first embedding portion further has a window which corresponds to the first recessed groove in position and makes the upper ground terminal partially surrounded by air.

In some embodiments, at least a part of each of two side edges of the first upper held portion of the upper ground terminal is embedded in the first embedding portion of the upper insulative frame and is not exposed in the first recessed groove.

In some embodiments, the two side edges of the first upper held portion of the upper ground terminal each are formed with an oblique surface which is obliquely toward a position where the first recessed groove is presented.

In some embodiments, the upper soldering portions of the upper ground terminal is adapted to be soldered by surface mounting technology.

In some embodiments, the lower terminal module comprises a plurality of lower terminals and a lower insulative frame, the plurality of lower terminals comprise multiple lower signal terminals and at least one lower ground terminal, the multiple lower signal terminals form lower signal terminal pairs which are spaced apart from each other by the at least one lower ground terminal, each lower terminals has a lower vertical segment and a lower horizontal segment, the lower horizontal segment has a lower held portion and a lower cantilevered arm portion which extends from the lower held portion, the lower vertical segment has a lower extension portion and a lower soldering portion which extends from the lower extension portion, the lower insulative frame has an embedding portion which embeds the lower held portions of the lower horizontal segments of the plurality of lower terminals.

In some embodiments, the first embedding portion of the upper insulative frame positioned at the rear, the second embedding portion of the upper insulative frame positioned at the front and the embedding portion of the lower insulative frame together define an air passage, the air passage extends from the down to the up, penetrates the upper insulative frame and is communicated with the at least one first recessed groove.

In some embodiments, the second embedding portion of the upper insulative frame has at least one second recessed groove which corresponds to the at least one upper ground terminal in position, the embedding portion of the lower insulative frame has at least one third recessed groove which corresponds to the at least one lower ground terminal in position.

In some embodiments, the second recessed groove extends to a surface of the second upper held portion of the upper ground terminal, at least a part of each of two side edges of the second upper held portion of the upper ground terminal is embedded in the second embedding portion of the upper insulative frame and is not exposed in the second recessed groove.

In some embodiments, the third recessed groove extends to a surface of the lower held portion of the lower ground terminal, at least a part of each of two side edges of the lower held portion of the lower ground terminal is embedded in the embedding portion of the lower insulative frame and is not exposed in the third recessed groove.

In some embodiments, the lower soldering portion of the lower ground terminal is adapted to be soldered by surface mounting technology.

In some embodiments, the upper terminal module and the lower terminal module are assembled with each other by concave-convex cooperation.

In some embodiments, the upper insulative frame further has at least one upper latching portion which is formed to a top surface of the upper insulative frame and two side latching portions which are respectively formed on lower ends of two sides of the upper insulative frame, the lower insulative frame further has at least one lower latching portion which is formed to a bottom surface of the lower insulative frame, the insulative body has latched portions which respectively correspond to the at least one upper latching portion, the two side latching portions and the at least one lower latching portion.

In some embodiments, the electrical connector further comprises a metal shell which is provided to the insulative body from outside.

In the electrical connector of the present disclosure, by that the first embedding portion of the upper insulative frame directly embeds the upper vertical segments of the plurality of upper terminals, coplanarity among the upper soldering portions of the upper vertical segments of the plurality of upper terminals can be ensured so as to be beneficial for a subsequent soldering operation between the upper soldering portions with the circuit board, and because the first embedding portion of the upper insulative frame does not need a subsequent operation for treating by heating, a pitch among the plurality of upper terminals can be maintained and affecting of the subsequent operation for treating by heating on signal integrity of the plurality of upper terminals can be avoided. Moreover, the first embedding portion and the second embedding portion are integrally formed to the upper insulative frame, which makes the upper terminal module firmer. Moreover, with the multiple first recessed grooves which respectively correspond to the multiple upper ground terminals in position, a total usage amount of the insulative material embedding the plurality of upper terminals can be reduced so as to shorten an electronic path, the usage amount of the insulative material is concentrated on the upper signal terminal pairs so as to increase coupling amount between the upper signal terminals of the upper signal terminal pair and reduce interference between the upper signal terminal pairs, and in turn improve signal integrity.

BRIEF DESCRIPTION OF THE DRAWINGS

Other features and effects of the present disclosure will be apparent in embodiments referring to the accompanying figures, in which.

DETAILED DESCRIPTION

Figure 1:
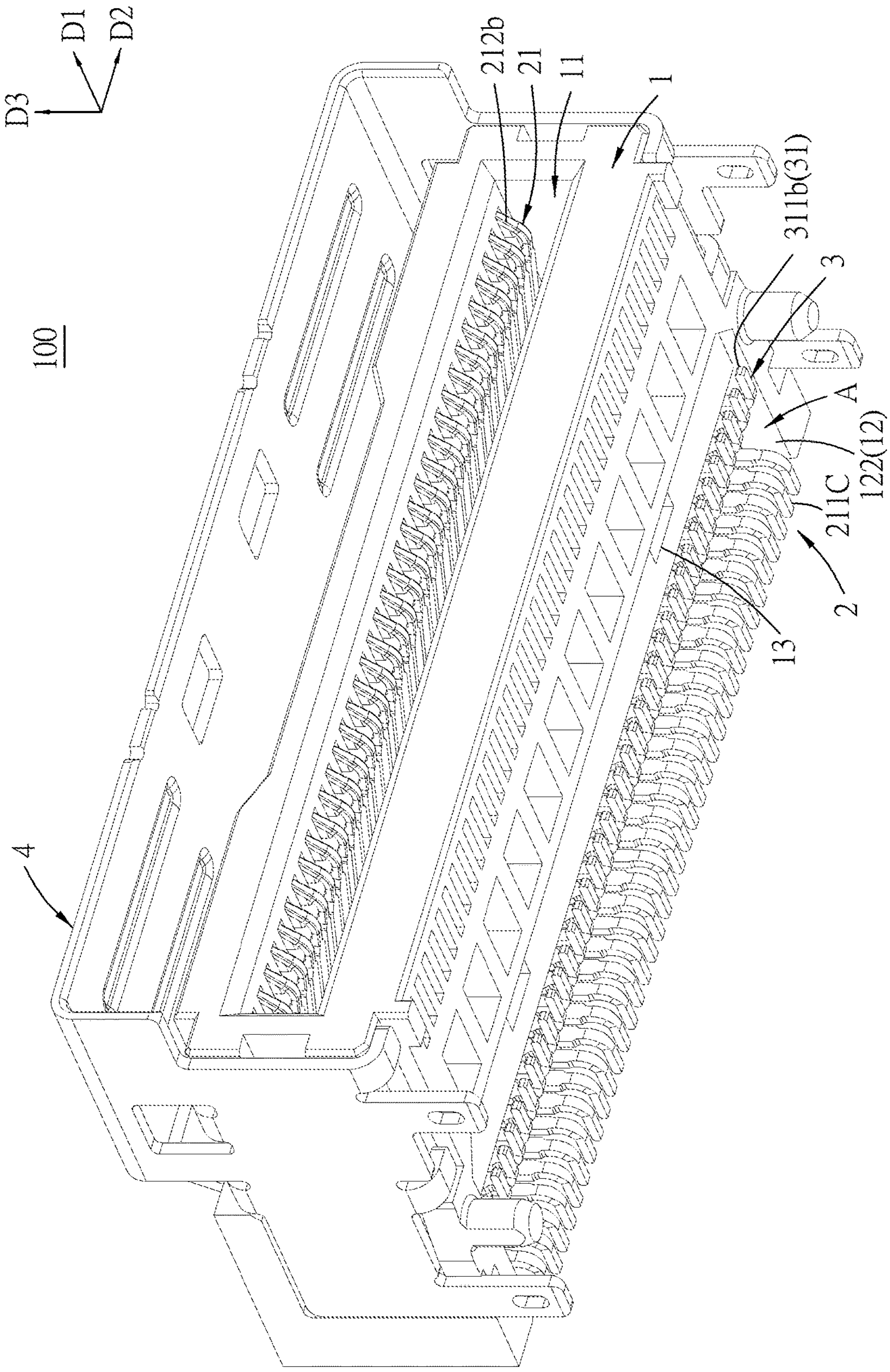
FIG. 1 is a perspective view of an embodiment of an electrical connector of the present disclosure.
Figure 2:
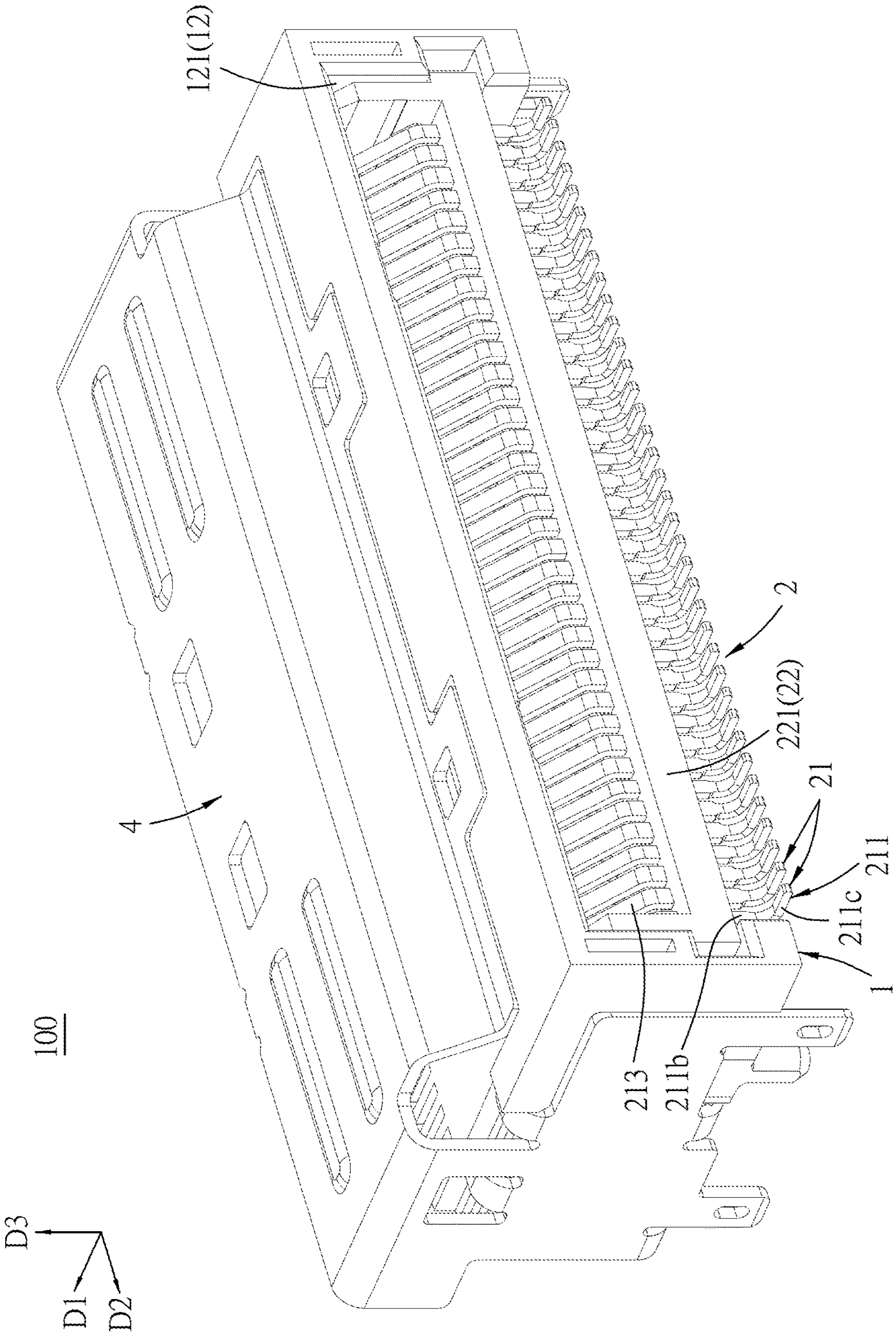
FIG. 2 is a perspective view of the embodiment of FIG. 1 from another angle.
Figure 3:
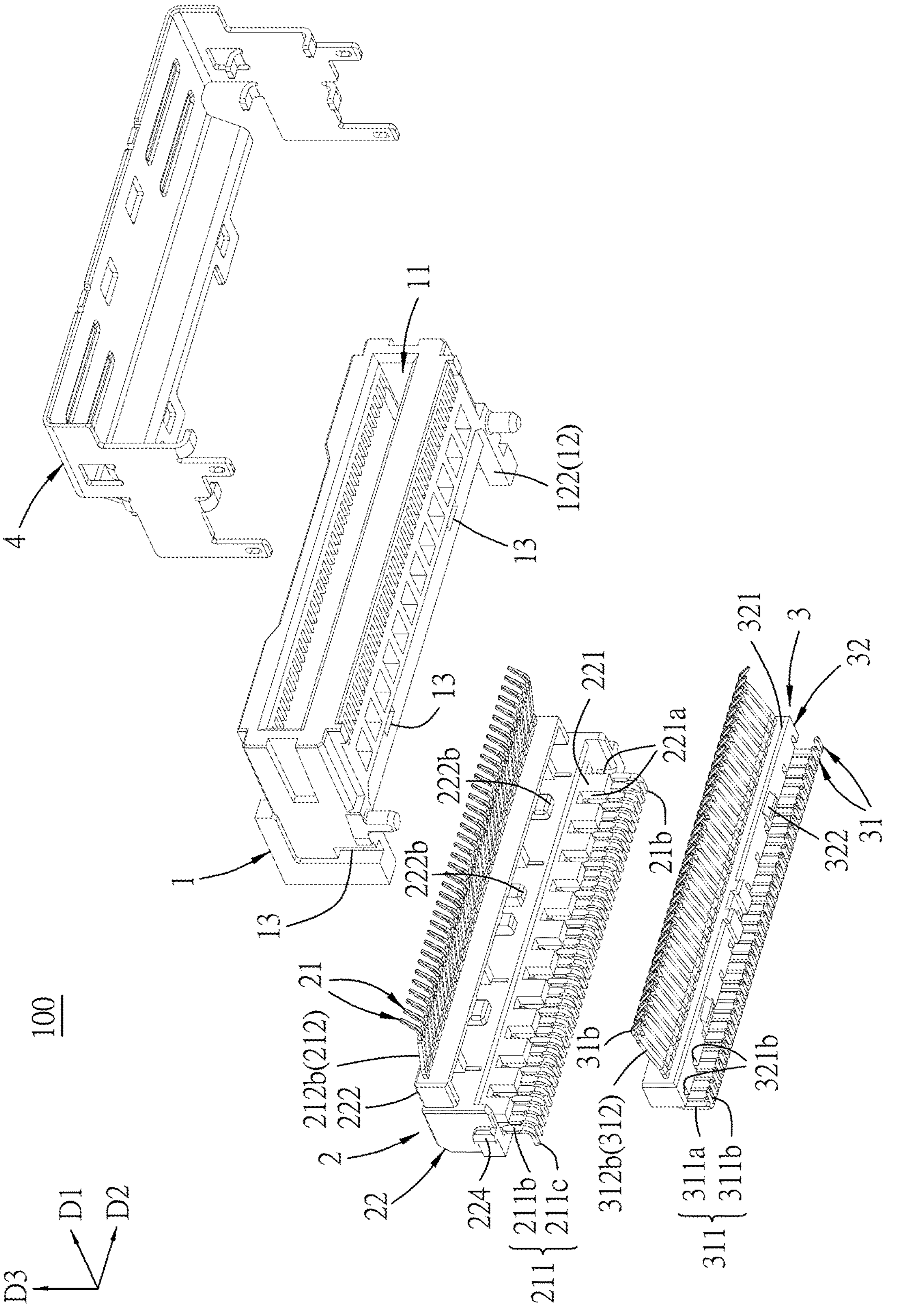
FIG. 3 is a perspective exploded view of FIG. 1.
Figure 4:
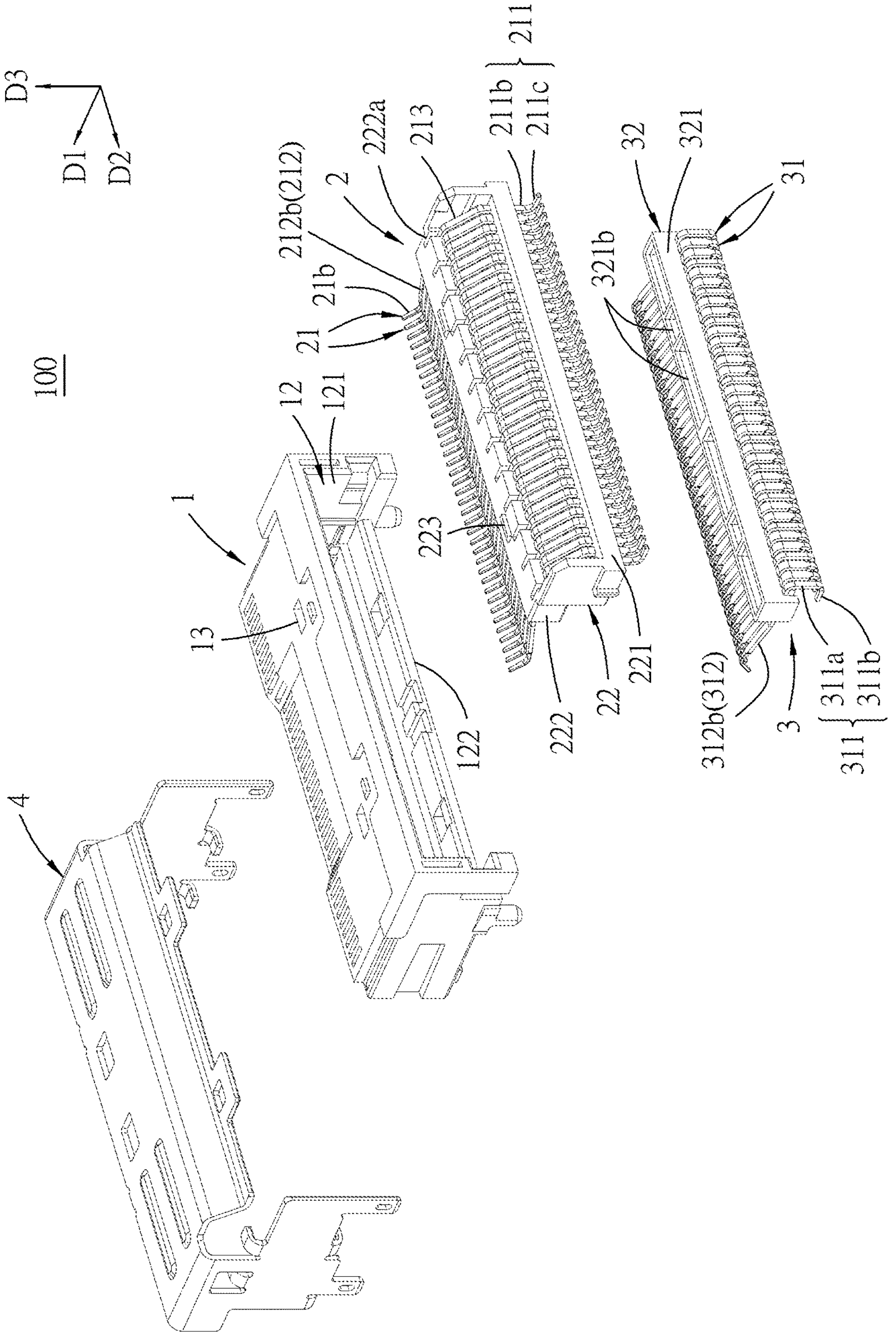
FIG. 4 is a perspective exploded view of FIG. 2.

Referring to FIG. 1 to FIG. 4, an embodiment of an electrical connector 100 includes an insulative body 1, an upper terminal module 2, a lower terminal module 3, and a metal shell 4.

For example, the insulative body 1 may be made from an insulative material, such as a plastic or the like. In the present embodiment, the insulative body 1 has a mating groove 11, which is formed rearwardly from a front end of the insulative body 1 in a front-rear direction D1 (a direction to which the arrow points is front, and an opposite direction is rear) and extends transversely in a left-right direction D2 (a direction to which the arrow points is right, and an opposite direction is left). The insulative body 1 also includes a mounting groove 12 which is formed forwardly from a rear end of the insulative body 1 and is communicated with the mating groove 11. The mounting groove 12 has a rear end opening 121, which is positioned toward the rear of the insulative body 1, and a bottom portion opening 122, which is communicated with the rear end opening 121 and is toward the bottom of the insulative body 1 along an up-down direction D3 (a direction to which an arrow points is up, and an opposite direction is down). The upper terminal module 2 and the lower terminal module 3 are arranged in the up-down direction D3, are assembled with each other, and together are provided to the insulative body 1. The metal shell 4 is provided to the insulative body 1, surrounds the insulative body 1 from outside, and can function as shielding electromagnetic interference. However, in other implementing manners, the metal shell 4 also may be omitted, so the present disclosure is not limited to the present embodiment.

Figure 5:
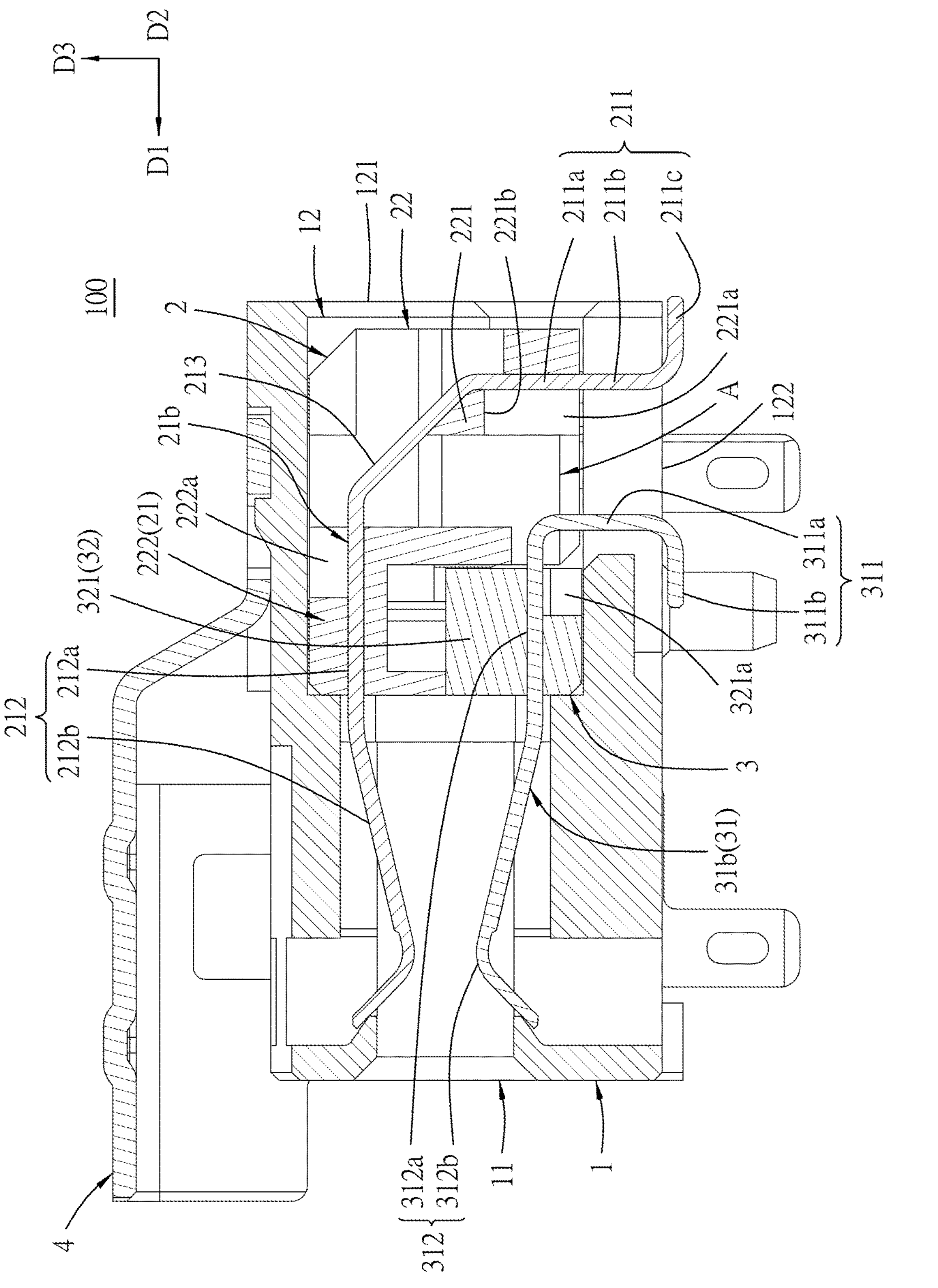
FIG. 5 is a cross-sectional view of the embodiment.
Figure 6:
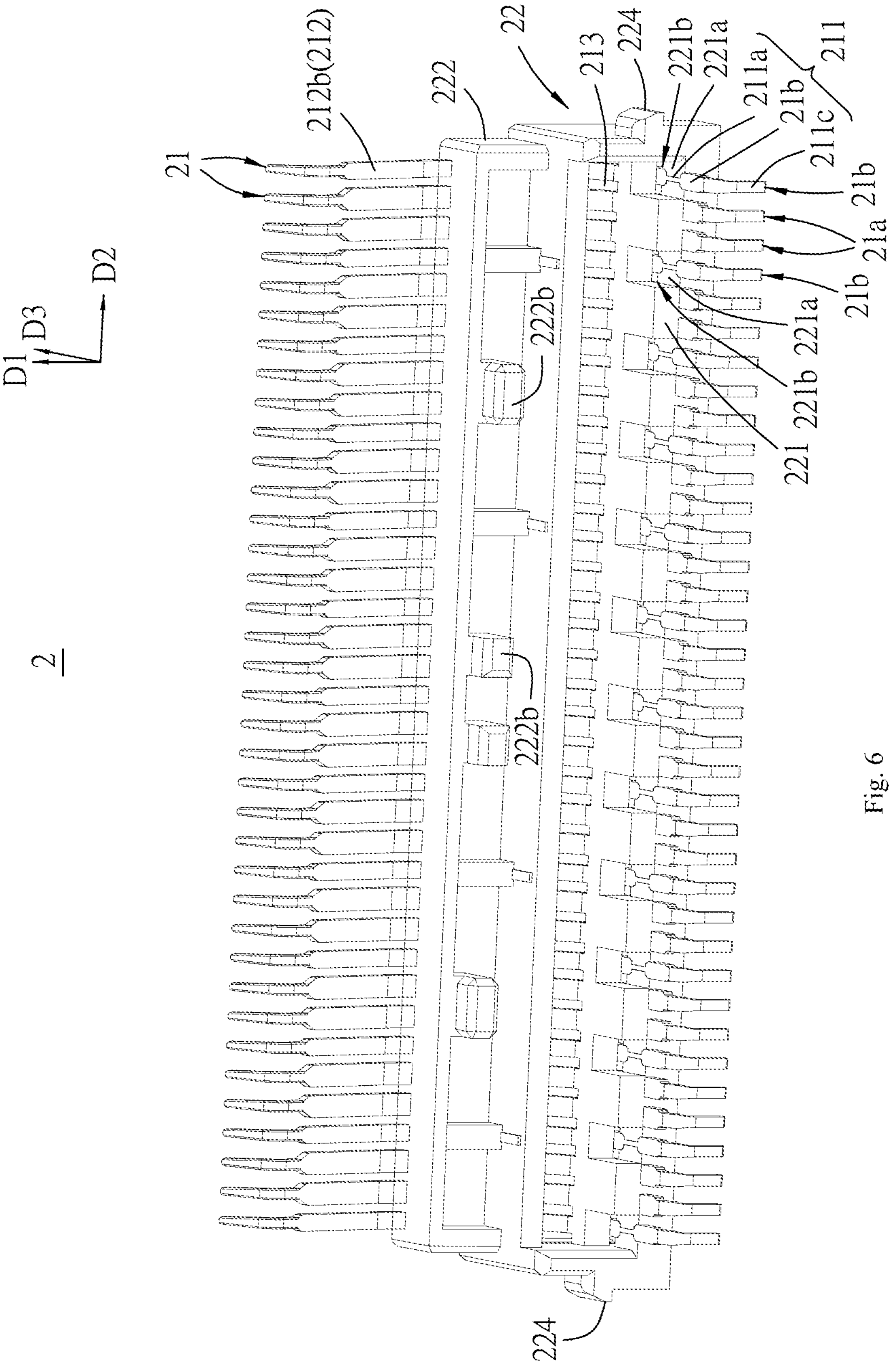
FIG. 6 is a perspective view of an upper terminal module of the embodiment.
Figure 7:
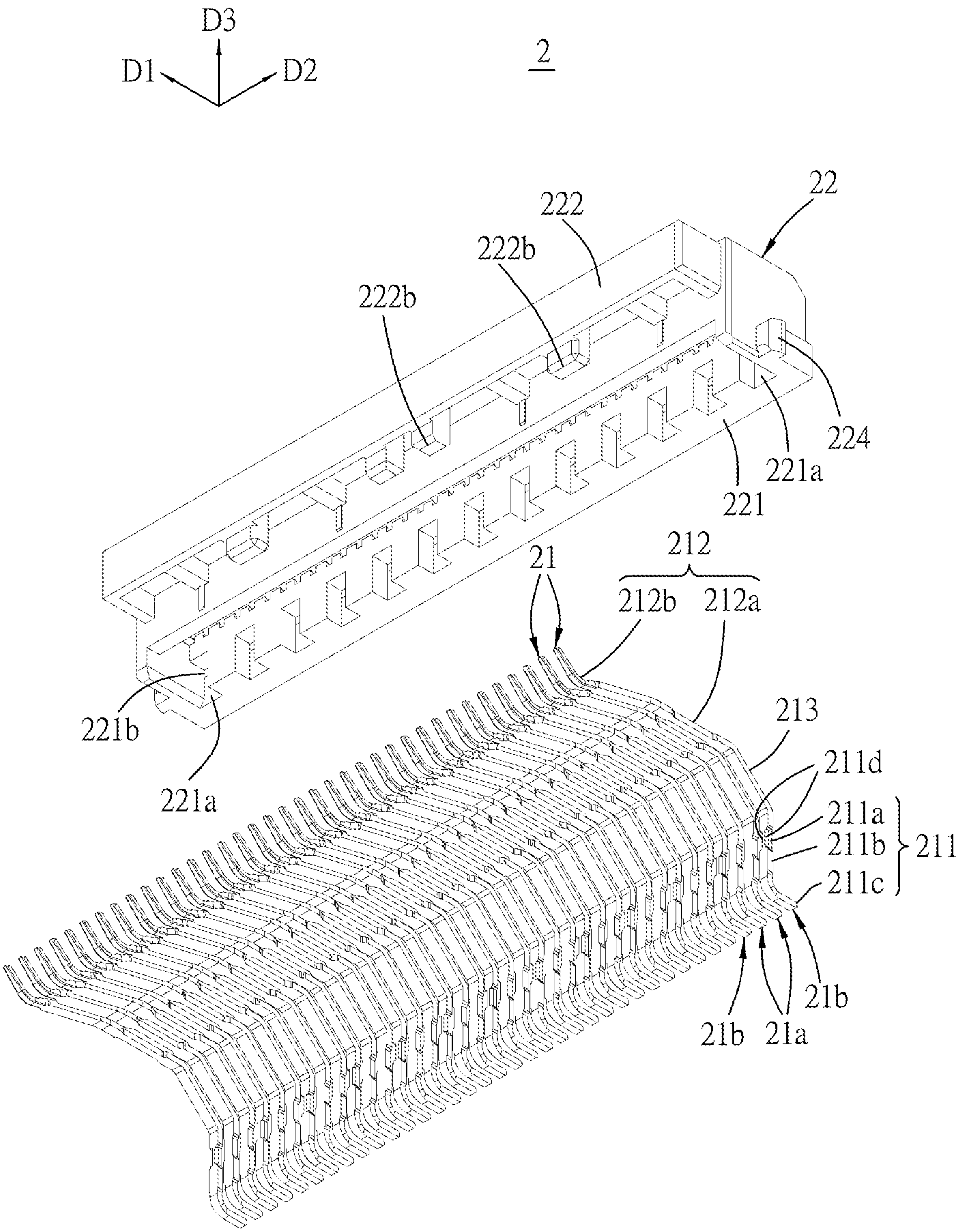
FIG. 7 is a perspective exploded view of the upper terminal module of the embodiment.
Figure 8:
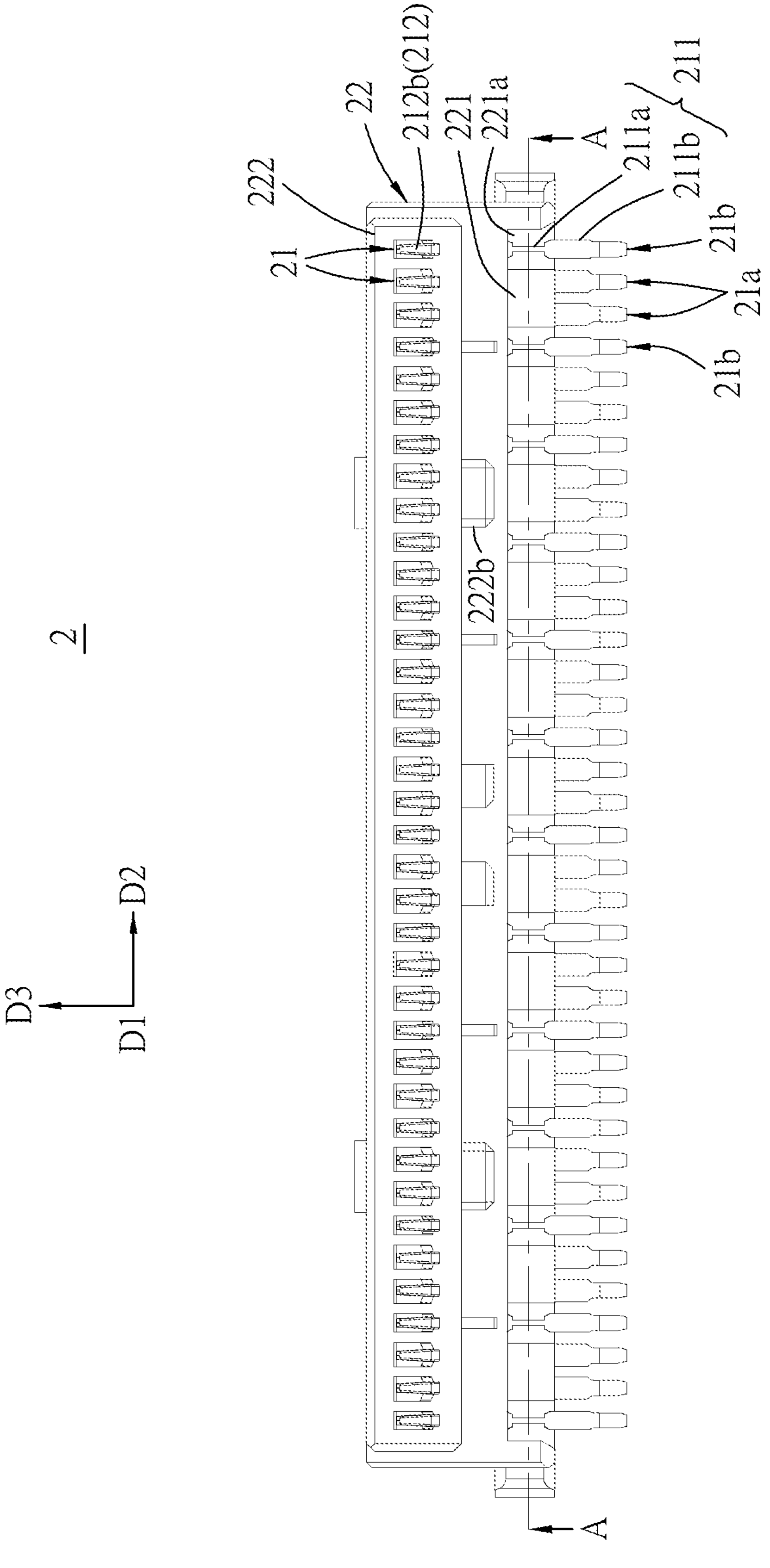
FIG. 8 is a front view of the upper terminal module of the embodiment.
Figure 9:
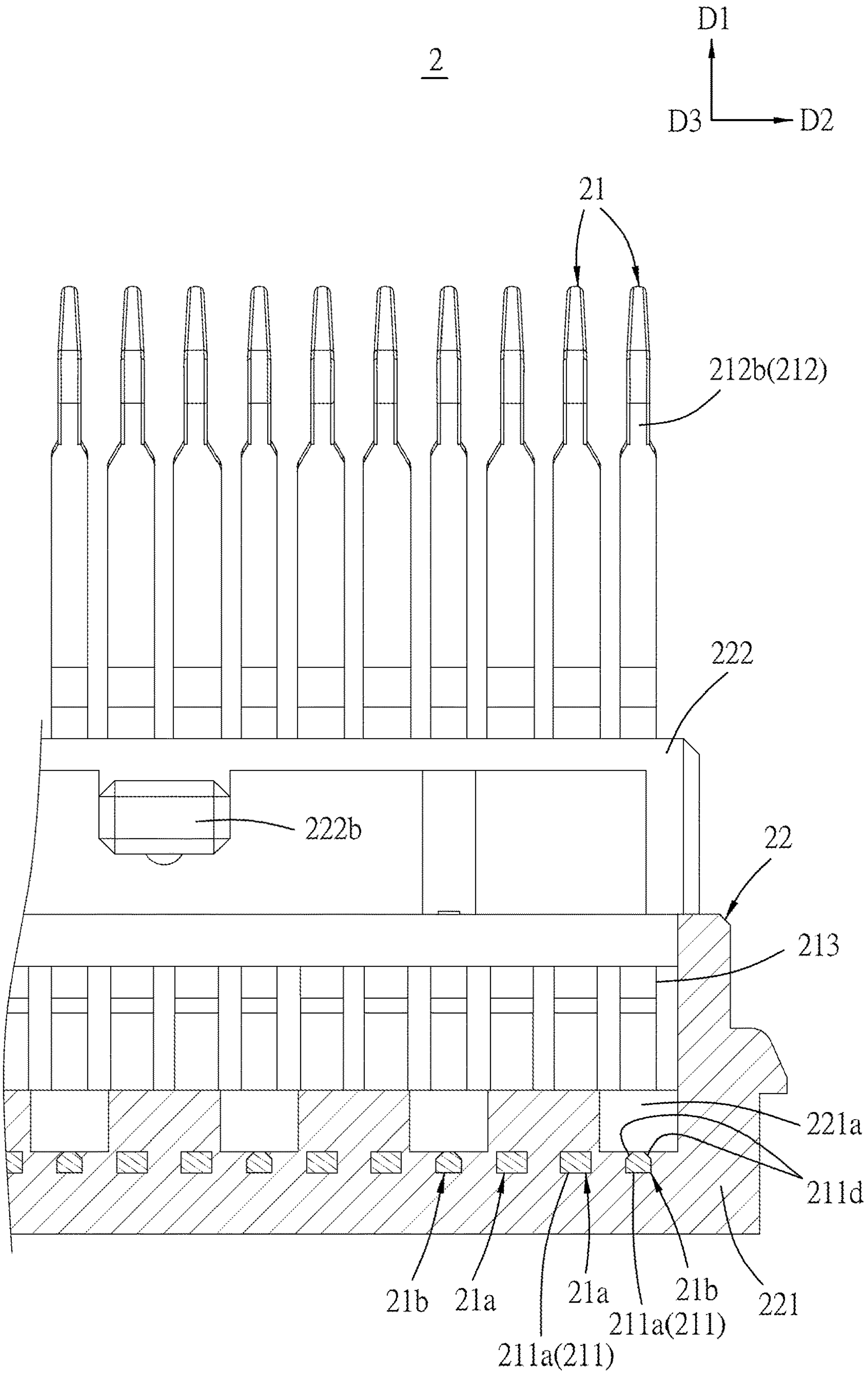
FIG. 9 is a partial cross-sectional view taken along a line A-A of FIG. 8.

Referring to FIG. 5 to FIG. 9, the upper terminal module 2 includes a plurality of upper terminals 21, which are arranged side by side in the left-right direction D2, and an upper insulative frame 22 which is used to fix the plurality of upper terminals 21. The plurality of upper terminals 21 include multiple upper signal terminals 21*a* and multiple upper ground terminals 21*b*. The multiple upper signal terminals 21*a* form upper signal terminal pairs which are spaced apart from each other by the multiple ground terminals 21*b*. Specifically, in the present embodiment, each upper signal terminal pair is distributed between the two corresponding adjacent upper ground terminals 21*b*. Each upper terminal 21 has an upper vertical segment 211 which substantially extends vertically along the up-down direction D3, an upper horizontal segment 212 which substantially extends horizontally along the front-rear direction D1, and an upper bending segment 213 which is connected between the upper vertical segment 211 and the upper horizontal segment 212. The upper vertical segment 211 has a first upper held portion 211*a*, an upper extension portion 211*b* which extends downwardly from the first upper held portion 211*a*, and an upper soldering portion 211*c* which extends rearwardly from the upper extension portion 211*b*. For example, the upper soldering portions 211*c* of the multiple upper around terminals 21*b* are soldered to a circuit board (not shown) by surface mounting technology (SMT). The upper horizontal segment 212 has a second upper held portion 212*a* and an upper cantilevered arm portion 212*b* which extends forwardly from the second upper held portion 212*a*.

The upper insulative frame 22 has a first embedding portion 221, which extends along the left-right direction D2 and embeds the first upper held portions 211*a* of the upper vertical segments 211, and a second embedding portion 222, which extends along the left-right direction D2 and embeds the second upper held portions 212*a* of the upper horizontal segments 212. Here, the first embedding portion 221 is positioned at the rear of the upper insulative frame 22 relative to the second embedding portion 222, and the second embedding portion 222 is positioned at the front of the upper insulative frame 22 relative to the first embedding portion 221. Moreover, for example, the first embedding portion 221 and the second embedding portion 222 may be made from an insulative material, such as a plastic or the like, and respectively embed the first upper held portions 211*a* and the second upper held portions 212*a* by insert molding; however, the present disclosure is not limited thereto. The first embedding portion 221 has multiple first recessed grooves 221*a* which respectively correspond to the multiple upper ground terminals 21*b* in position. Specifically, in the present embodiment, the multiple first recessed grooves 221*a* are formed rearwardly from a front-end surface of the first embedding portion 221, and extend to surfaces of the first upper held portions 211*a* of the multiple upper ground terminals 21*b* respectively so as to make front surfaces of the first upper held portions 211*a* of the multiple upper ground terminals 21*b* exposed therein respectively. It is noted that, in other implementing manners, the multiple first recessed grooves 221*a* also may not extend to the surfaces of the first upper held portions 211*a* of the multiple upper ground terminals 21*b* respectively and, in this embodiment, the front surfaces of the first upper held portions 211*a* of the multiple upper ground terminals 21*b* are not exposed from the first embedding portion 221.

Moreover, in a case in which the multiple first recessed grooves 221*a* extend to the surfaces of the first upper held portions 211*a* of the multiple upper ground terminals 21*b* respectively so as to make the front surfaces of the first upper held portions 211*a* of the multiple upper ground terminals 21*b* exposed therein respectively, in the present embodiment, in order to ensure that the first upper held portions 211*a* of the multiple upper ground terminals 21*b* are firmly held by the first embedding portion 221, a part of each of two side edges of the first upper held portion 211*a* of each upper ground terminal 21*b* in the left-right direction D2 is embedded in the first embedding portion 221 of the upper insulative frame 22 and is not exposed in the corresponding first recessed groove 221*a*. Specifically, the two side edges of the first upper held portion 211*a* of each upper ground terminal 21*b* each are formed with an oblique surface 211*d* that is obliquely positioned toward a location where the first recessed groove 221*a* is presented. The oblique surface 211*d* is embedded by the first embedding portion 221 of the upper insulative frame 22 and is not exposed in the corresponding first recessed groove 221*a*.

As such, the first embedding portion 221 of the upper insulative frame 22 directly embeds the upper vertical segments 211 of the plurality of upper terminals 21, coplanarity among the upper soldering portions 211*c* of the upper vertical segments 211 of the plurality of upper terminals 21 can be ensured so as to be beneficial for a subsequent soldering operation between the upper soldering portions 211*c* with the circuit board, and, because the first embedding portion 221 of the upper insulative frame 22 does not need a subsequent operation for treating through heat, a pitch among the plurality of upper terminals 21 can be maintained and an effect of the subsequent operation for treating through heat on signal integrity of the plurality of upper terminals 21 can be avoided. Moreover, with the multiple first recessed grooves 221*a* which respectively correspond to the multiple upper ground terminals 21*b* in position, a total usage amount of the insulative material embedding the plurality of upper terminals 21 can be reduced so as to shorten an electronic path, the usage amount of the insulative material is concentrated on the upper signal terminal pairs so as to increase coupling amount between the upper signal terminals 21*a* of the upper signal terminal pair and reduce interference between the upper signal terminal pairs, and, in turn, improve signal integrity.

Moreover, in the present embodiment, the first embedding portion 221 further has multiple windows 221*b* which respectively correspond to the multiple first recessed grooves 221*a* in position and respectively make the multiple upper ground terminals 21*b* be partially surrounded by air. Because the multiple windows 221*b* make the multiple upper ground terminals 21*b* partially surrounded by air, signal integrity can be further improved.

Figure 10:
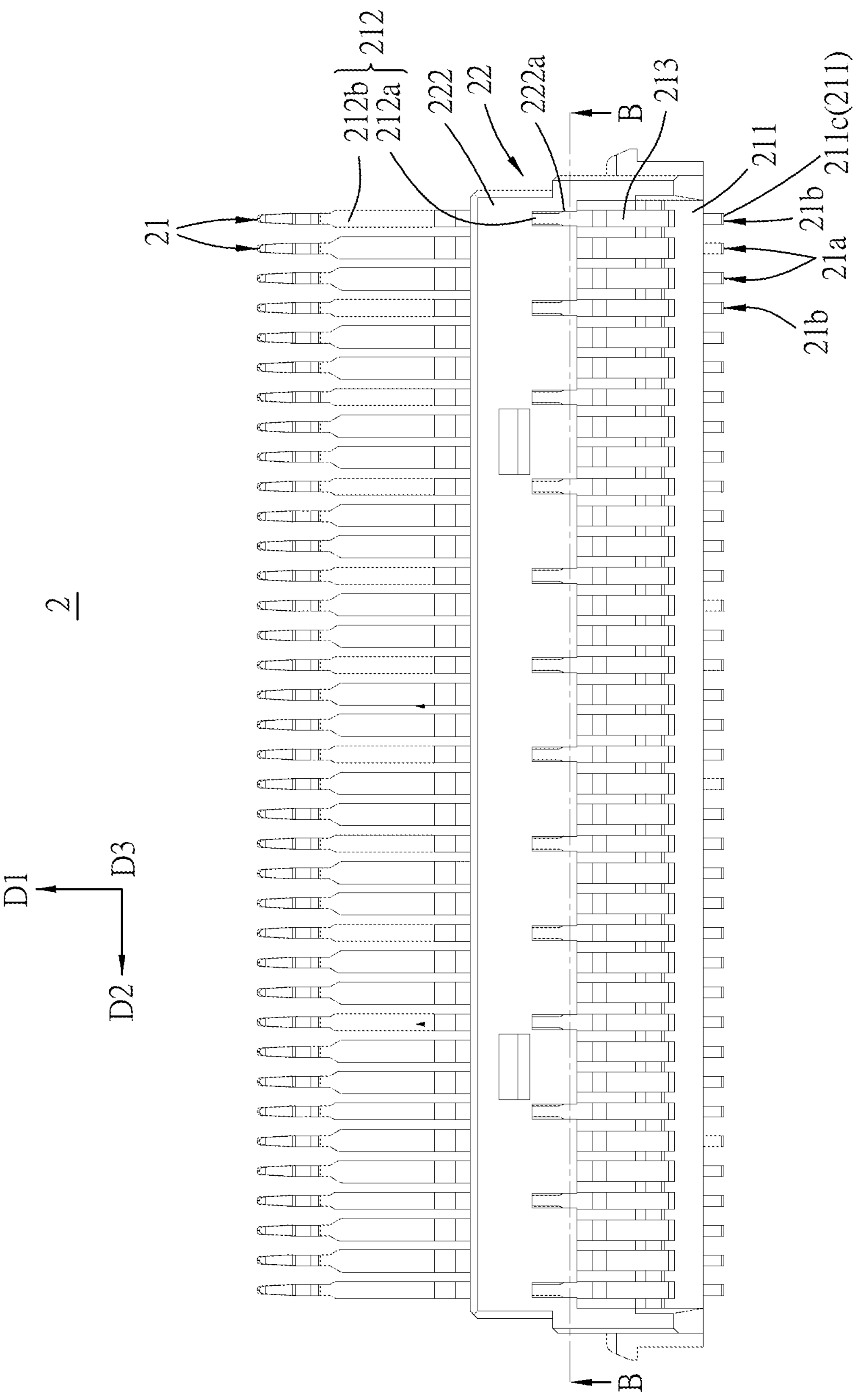
FIG. 10 is a top view of the upper terminal module of the embodiment.
Figure 11:
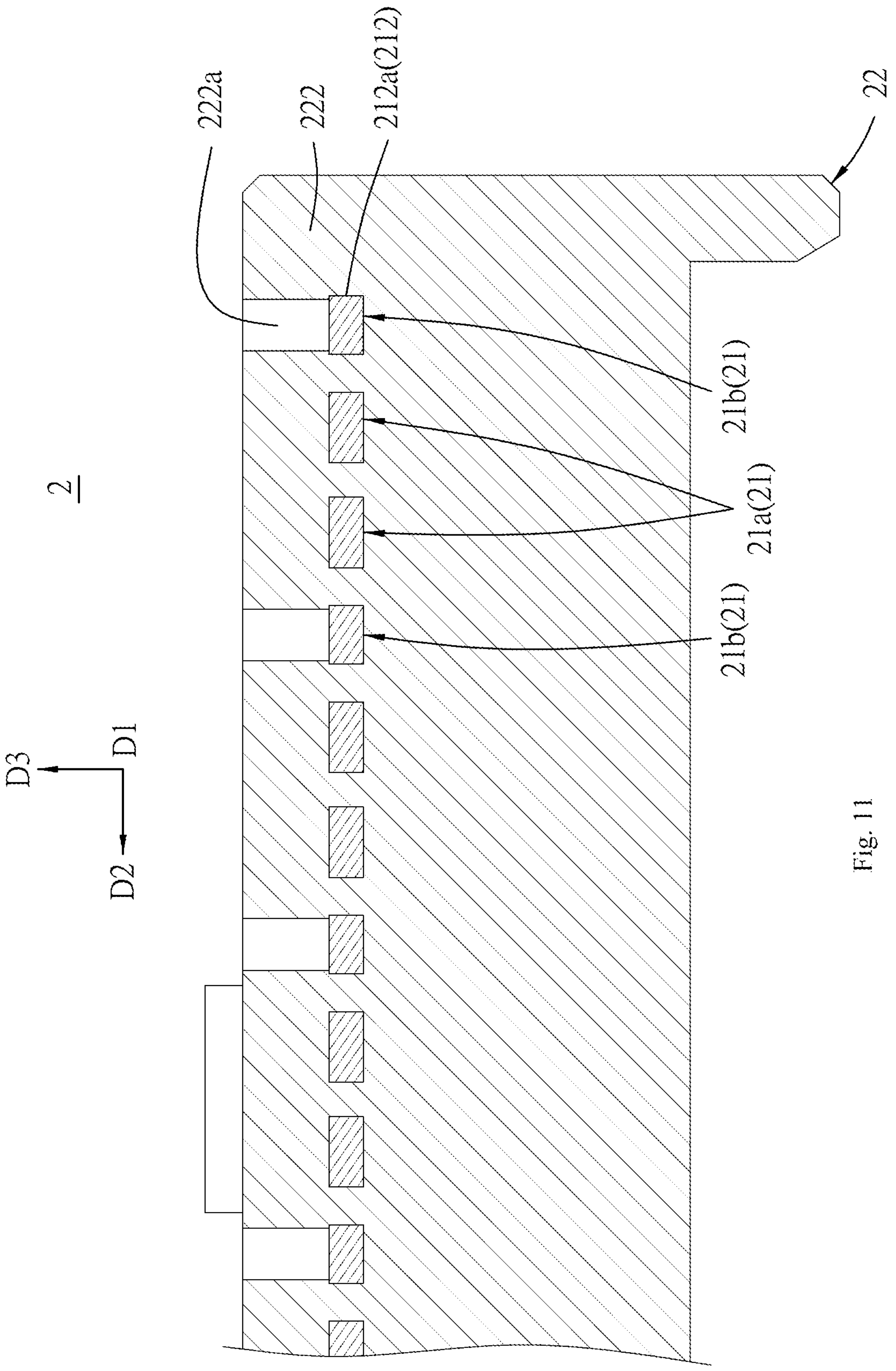
FIG. 11 is a partial cross-sectional view taken along a line B-B of FIG. 10.

Referring to FIG. 5, FIG. 7, FIG. 10, and FIG. 11, the second embedding portion 222 of the upper insulative frame 22 has multiple second recessed grooves 222*a* which respectively correspond to the multiple upper ground terminals 21*b* in position. Specifically, in the present embodiment, the multiple second recessed grooves 222*a* are formed downwardly from a top surface of the second embedding portion 222 and respectively extend to upper surfaces of the second upper held portions 212*a* of the multiple upper ground terminals 21*b*. In other implementations, similar to the multiple first recessed grooves 221*a*, the multiple second recessed grooves 222*a* may not respectively extend to the upper surfaces of the second upper held portions 212*a* of the multiple upper ground terminals 21*b*. Moreover, in a case in which the multiple second recessed grooves 222*a* respectively extend to the upper surfaces of the second upper held portions 212*a* of the multiple upper ground terminals 21*b*, in order to make the second upper held portions 212*a* of the multiple upper ground terminals 21*b* firmly held by the second embedding portion 222, a part of each of two side edges of the second upper held portion 212*a* of each upper ground terminal 21*b* in the left-right direction D2 is embedded in the second embedding portion 222 of the upper insulative frame 22 and is not exposed in the corresponding second recessed groove 222*a*. Similar to the multiple first recessed grooves 221*a*, the multiple second recessed grooves 222*a* also improve signal integrity.

Figure 12:
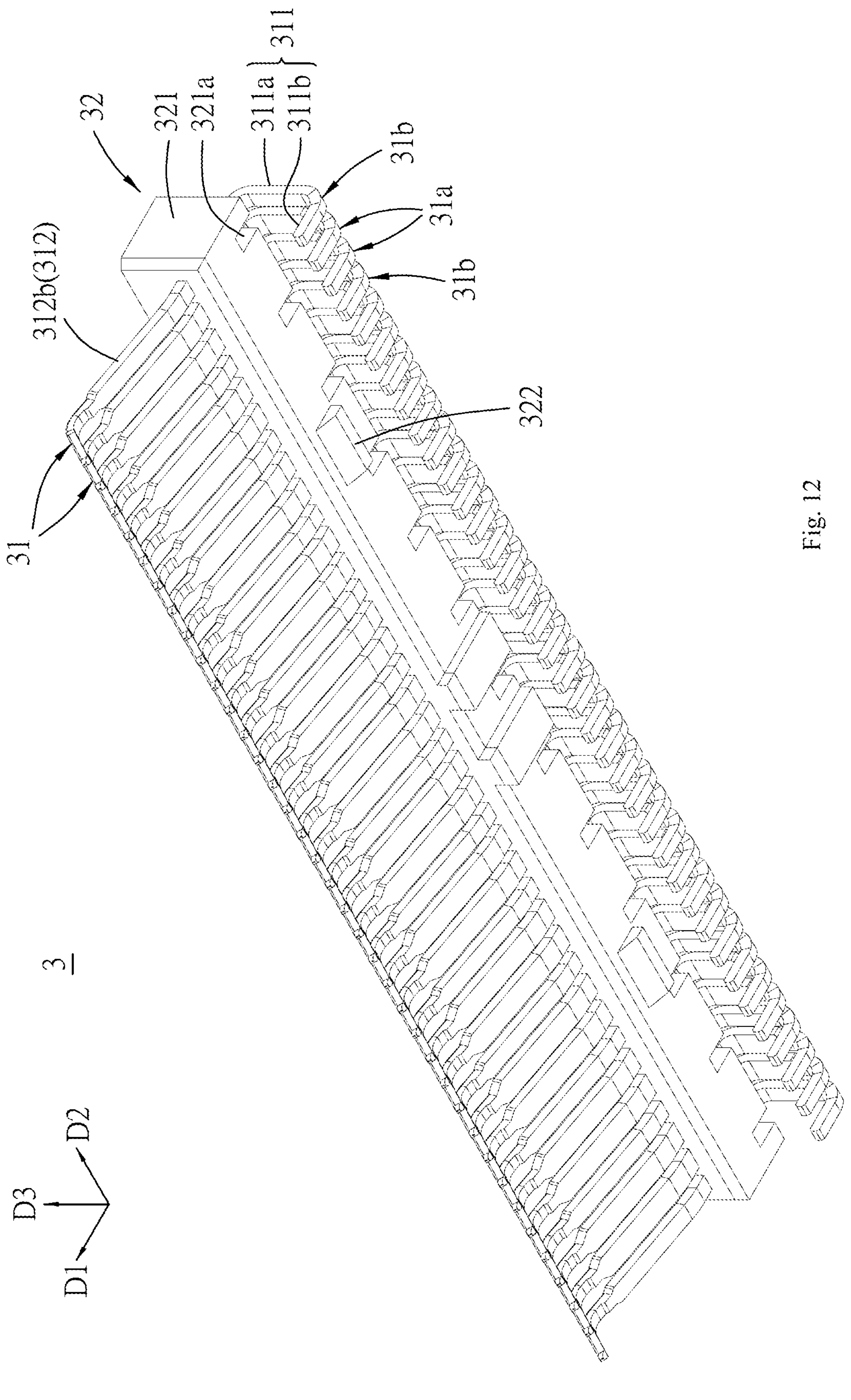
FIG. 12 is a perspective view of a lower terminal module of the embodiment.
Figure 13:
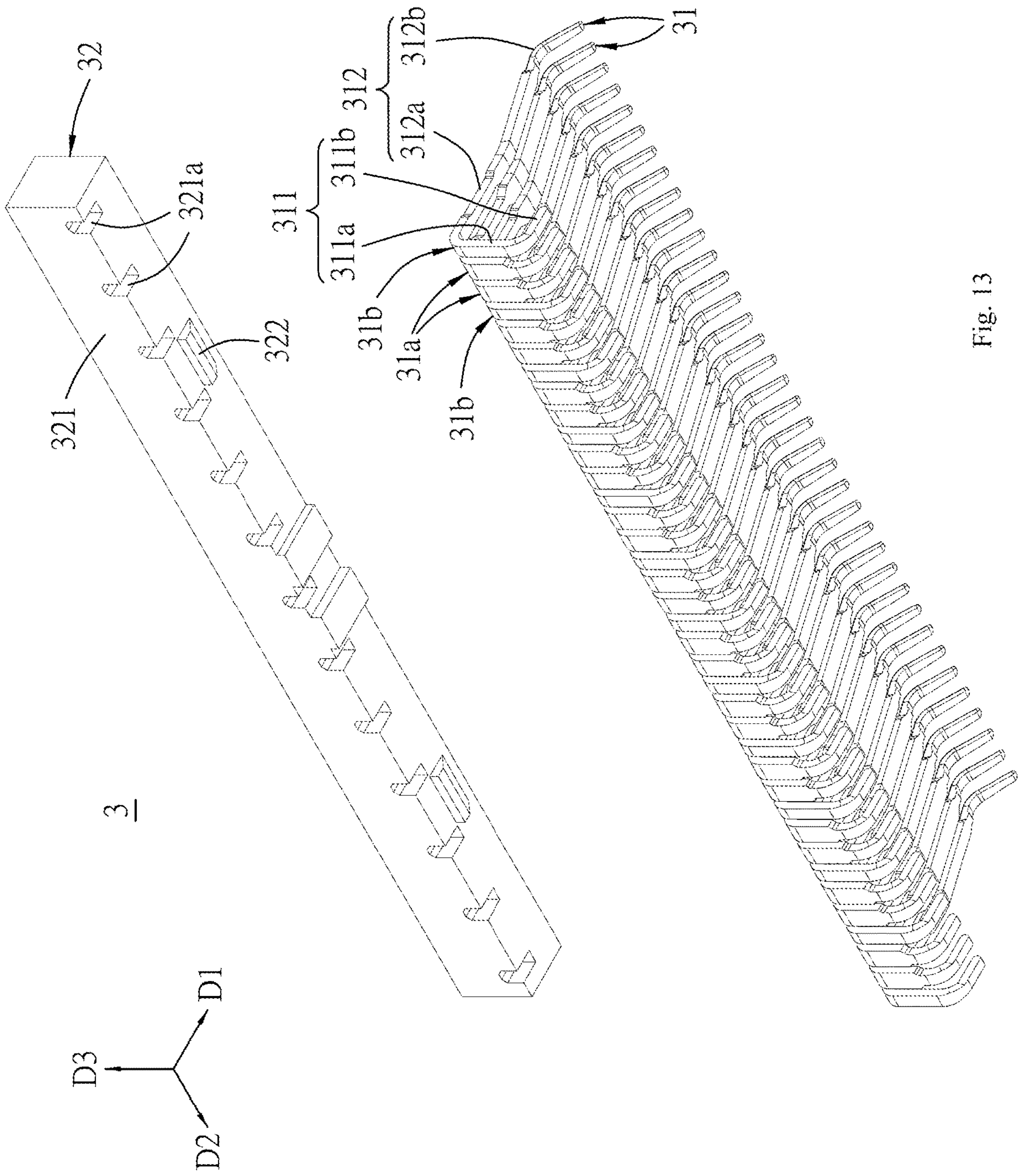
FIG. 13 is a perspective exploded view of the lower terminal module of the embodiment.
Figure 14:
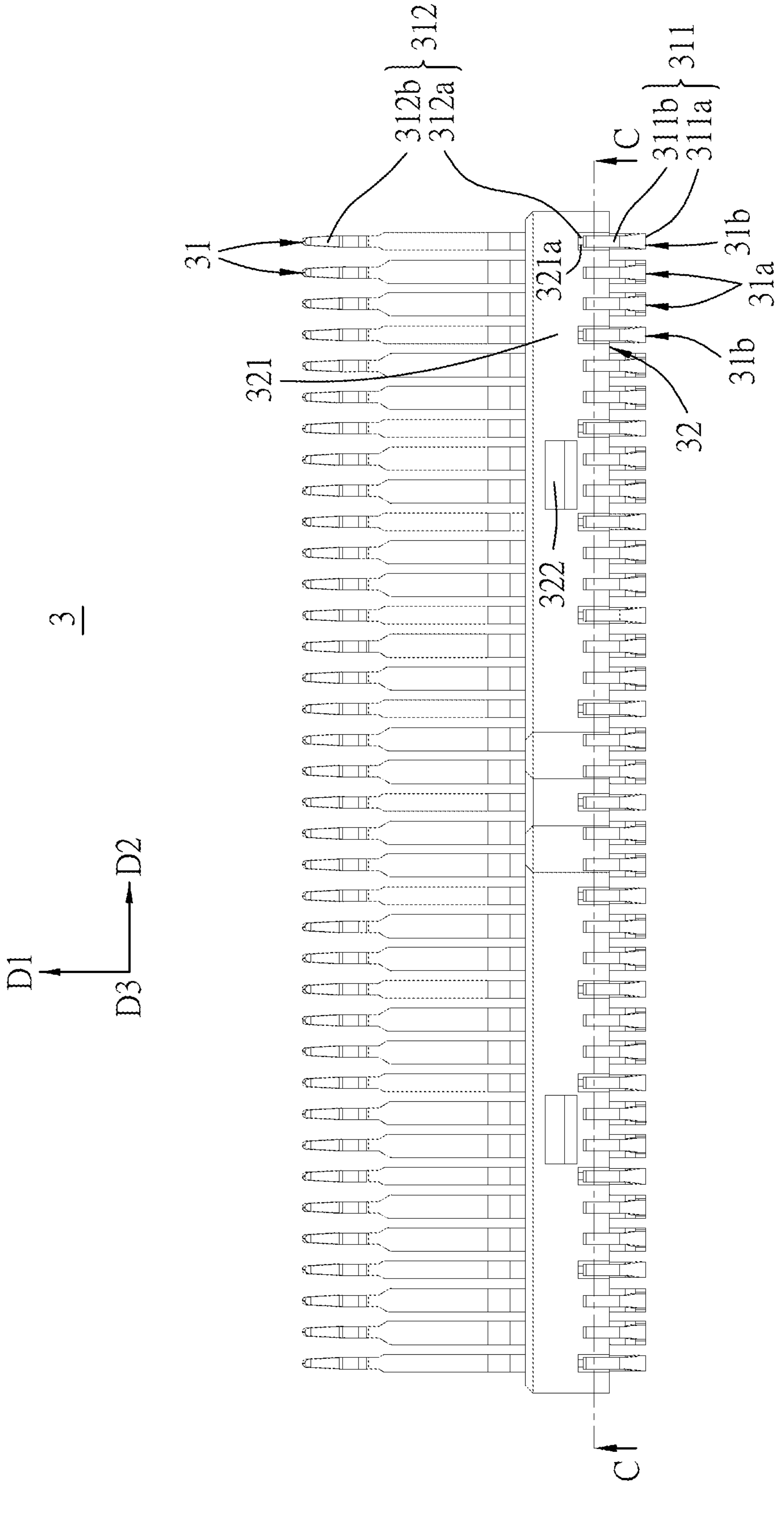
FIG. 14 is a bottom view of the lower terminal module of the embodiment.
Figure 15:
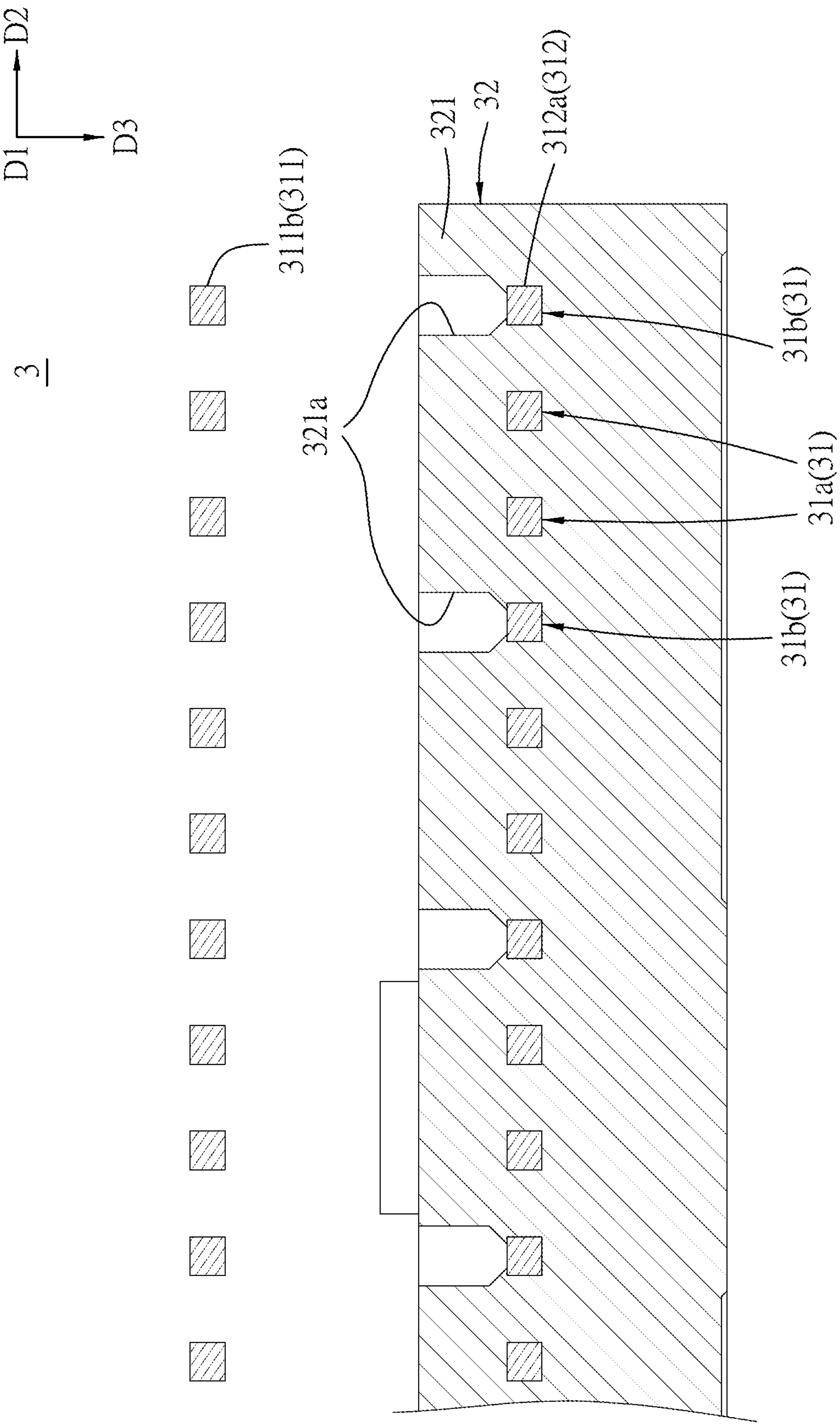
FIG. 15 is a partial cross-sectional view taken along a line C-C of FIG. 14.

Referring to FIG. 5 and FIG. 12 to FIG. 15, the lower terminal module 3 includes a plurality of lower terminals 31, which are arranged side by side along the left-right direction D2, and a lower insulative frame 32 which is used to fix the plurality of lower terminals 31. The plurality of lower terminals 31 include multiple lower signal terminals 31*a* and multiple lower ground terminals 31*b*. The multiple lower signal terminals 31*a* form lower signal terminal pairs which are spaced apart from each other by the multiple lower ground terminals 31*b*. Specifically, in the present embodiment, each lower signal terminal pair is distributed between the two corresponding adjacent lower ground terminals 31*b*. Each lower terminal 31 has a lower vertical segment 311 which substantially extends vertically along the up-down direction D3 and a lower horizontal segment 312 which substantially extends horizontally along the front-rear direction D1 and is connected to the lower vertical segment 311. The lower horizontal segment 312 has a lower held portion 312*a* and a lower cantilevered arm portion 312*b* which extends forwardly from the lower held portion 312*a*. The lower vertical segment 311 has a lower extension portion 311*a* and a lower soldering portion 311*b* which extends forwardly from the lower extension portion 311*a*. For example, the lower soldering portions 311*b* of the multiple lower ground terminals 31*b* are soldered to the circuit board by surface mounting technology (SMT).

The lower insulative frame 32 has an embedding portion 321 which embeds the lower held portions 312*a* of the lower horizontal segments 312. For example, the embedding portion 321 is made from an insulative material, such as a plastic or the like, and embeds the lower held portions 312*a* by insert molding; however, the present disclosure is not limited thereto. The embedding portion 321 of the lower insulative frame 32 has multiple third recessed grooves 321*a* which respectively correspond to the multiple lower ground terminals 31*b* in position. Specifically, in the present embodiment, the multiple third recessed grooves 321*a* are formed upwardly from a bottom surface of the embedding portion 321 and respectively extend to lower surfaces of the lower held portions 312*a* of the multiple lower ground terminals 31*b*. In other implementations, similar to the multiple first recessed grooves 221*a*, the multiple third recessed grooves 321*a* may not respectively extend to the lower surfaces of the lower held portions 312*a* of the multiple lower ground terminals 31*b*. Moreover, in a case in which the multiple third recessed grooves 321*a* respectively extend to the lower surfaces of the lower held portions 312*a* of the multiple lower ground terminals 31*b*, in order to make the lower held portions 312*a* of the multiple lower ground terminal 31*b* firmly held by the embedding portion 321, a pair of each of two side edges of the lower held portion 312*a* of each lower ground terminal 31*b* in the left-right direction D2 is embedded in the embedding portion 321 of the lower insulative frame 32, and is not exposed in the corresponding third recessed groove 321*a*. Similar to the multiple first recessed grooves 221*a*, the multiple third recessed grooves 321*a* also improve signal integrity.

Referring again to FIG. 1 to FIG. 5, the upper insulative frame 22 of the upper terminal module 2 and the lower insulative frame 32 of the lower terminal module 3 are assembled with each other and together are provided to the mounting groove 12 of the insulative body 1. The upper cantilevered arm portions 212*b* of the plurality of upper terminals 21 and the lower cantilevered arm portions 312*b* of the plurality of lower terminals 31 extend forwardly into the mating groove 11 of the insulative body 1. Specifically, the upper insulative frame 22 of the upper terminal module 2 and the lower insulative frame 32 of the lower terminal module 3 are forwardly mounted into the mounting groove 12 from the rear end opening 121 of the mounting groove 12, and the upper soldering portions 211*c* of the plurality of upper terminals 21 of the upper terminal module 2 and the lower soldering portions 311*b* of the plurality of lower terminal 31 of the lower terminal module 3 extend out of the mounting groove 12 from the bottom portion opening 122 of the mounting groove 12 so as to facilitate soldering with the circuit board. The second embedding portion 222 of the upper insulative frame 22 of the upper terminal module 2 and the embedding portion 321 of the lower insulative frame 32 of the lower terminal module 3 are assembled with each other by concave-convex cooperation. For example, the second embedding portion 222 has protruding portions 222*b* which extend downwardly, and the embedding portion 321 has recessed portions 321*b* which respectively engage with the protruding portions 222*b* by concave-convex cooperation. Moreover, in the present embodiment, the upper insulative frame 22 further has two upper latching portions 223 which are formed on the top surface of the second embedding portion 222 and two side latching portions 224 which are respectively formed on lower ends of two sides of the second embedding portion 222. The lower insulative frame 32 further includes two lower latching portions 322 which are formed on the bottom surface of the embedding portion 321. The insulative body 1 has latched portions 13 which respectively correspond to the two upper latching portions 223, the two side latching portions 224, and the two lower latching portion 322. For example, the two upper latching portions 223, the two side latching portions 224, and the two lower latching portion 322 each have a latching block shape, and the latched portions 13 each have a latching hole shape which is communicated with the mounting groove 12; however, the present disclosure is not limited thereto.

In addition, the first embedding portion 221 of the upper insulative frame 22 positioned at the rear, the second embedding portion 222 of the upper insulative frame 22 positioned at the front, and the embedding portion 321 of the lower insulative frame 32 together define an air passage A. The air passage A extends from downwards to upwards, penetrates the upper insulative frame 22, and is communicated with the multiple first recessed grooves 221*a*. After the air passage A passes through the upper bending segments 213 of the plurality of upper terminals 21 it then extends rearwardly. A bottom portion of the air passage A is exposed from the bottom portion opening 122 of the mounting groove 12 of the insulative body 1, and a top portion of the air passage A is exposed from a part of the rear end opening 121 of the mounting groove 12 of the insulative body 1 which is positioned above the second embedding portion 222. Heat dissipation performance of the insulative body 1 can be promoted by the air passage A.

In the electrical connector 100 of the present disclosure, as the first embedding portion 221 of the upper insulative frame 22 directly embeds the upper vertical segments 211 of the plurality of upper terminals 21, coplanarity among the upper soldering portions 211*c* of the upper vertical segments 211 of the plurality of upper terminals 21 can be ensured so as to be beneficial for a subsequent soldering operation between the upper soldering portions 211*c* with the circuit board. Also, due to the first embedding portion 221 of the upper insulative frame 22 not needing a subsequent operation for treating through heat, a pitch among the plurality of upper terminals 21 can be maintained and affecting of the subsequent operation for treating through heat on signal integrity of the plurality of upper terminals 21 can be avoided. Moreover, the first embedding portion 221 and the second embedding portion 222 are integrally formed to the upper insulative frame 22, which makes the upper terminal module 2 more firm. Additionally, with the multiple first recessed grooves 221*a* which respectively correspond to the multiple upper ground terminals 21*b* in position, a total usage amount of the insulative material embedding the plurality of upper terminals 21 can be reduced so as to shorten an electronic path, the usage amount of the insulative material is concentrated on the upper signal terminal pairs so as to increase coupling amount between the upper signal terminals 21*a* of the upper signal terminal pair and reduce interference between the upper signal terminal pairs, and, in turn, improve signal integrity.

However, the above description is only for the embodiments of the present disclosure, and it is not intended to limit the implementing scope of the present disclosure, and simple equivalent changes and modifications made according to the claims and the contents of the specification are still included in the scope of the present disclosure.

What is claimed is:

1. An electrical connector, comprising:

an insulative body; and an upper terminal module and a lower terminal module which are assembled with each other and together are provided to the insulative body;

the upper terminal module comprising a plurality of upper terminals and an upper insulative frame;

the plurality of upper terminals comprising multiple upper signal terminals and multiple upper ground terminals, the multiple upper signal terminals forming upper signal terminal pairs which are spaced apart from each other by respective ones of the multiple upper ground terminals;

each upper terminal having an upper vertical segment, an upper horizontal segment, and an upper bending segment which is connected between the upper vertical segment and the upper horizontal segment;

the upper vertical segment having a first upper held portion, an upper extension portion which extends from the first upper held portion, and an upper soldering portion which extends from the upper extension portion;

the upper horizontal segment having a second upper held portion and an upper cantilevered arm portion which extends from the second upper held portion;

the upper insulative frame having a first embedding portion which embeds the first upper held portions of the upper vertical segments of the plurality of upper terminals and a second embedding portion which embeds the second upper held portions of the upper horizontal segments of the plurality of upper terminals;

the first embedding portion having a plurality of first recessed grooves which respectively correspond to individual ones of the multiple upper ground terminals; and the first embedding portion being positioned at a rear of the upper insulative frame relative to the second embedding portion, the second embedding portion being positioned at a front of the upper insulative frame relative to the first embedding portion, and an air passage being defined in a space between the first embedding portion and the second embedding portion, the air passage extending downwards to upwards, and being communicated with the first recessed groove.

2. The electrical connector of claim 1, wherein each of the multiple upper ground terminals comprises upper soldering portions adapted to be soldered by surface mounting technology.

3. The electrical connector of claim 1, wherein the upper terminal module and the lower terminal module are assembled with each other by concave-convex cooperation.

4. The electrical connector of claim 1, wherein the electrical connector further comprises a metal shell which is provided to the insulative body from outside.

5. The electrical connector of claim 1, wherein the plurality of first recessed grooves extend to a surface of the first upper held portion of the upper ground terminal.

6. The electrical connector of claim 5, wherein the first embedding portion comprises a plurality of windows which respectively correspond to the plurality of first recessed grooves and makes the multiple upper ground terminals partially surrounded by air.

7. The electrical connector of claim 5, wherein at least a part of each of two side edges of the first upper held portion of the multiple upper ground terminals is embedded in the first embedding portion of the upper insulative frame and is not exposed in the multiple first recessed grooves.

8. The electrical connector of claim 7, wherein the two side edges of the first upper held portion of the multiple upper ground terminals each are formed with an oblique surface which is obliquely positioned towards the plurality of first recessed grooves.

9. The electrical connector of claim 1, wherein:

the lower terminal module comprises a plurality of lower terminals and a lower insulative frame;

the plurality of lower terminals comprise multiple lower signal terminals and at least one lower ground terminal;

the multiple lower signal terminals form lower signal terminal pairs which are spaced apart from each other by the at least one lower ground terminal;

each of the plurality of lower terminals has a lower vertical segment and a lower horizontal segment;

the lower horizontal segment has a lower held portion and a lower cantilevered arm portion which extends from the lower held portion;

the lower vertical segment has a lower extension portion and a lower soldering portion which extends from the lower extension portion; and the lower insulative frame has an embedding portion which embeds the lower held portions of the lower horizontal segments of the plurality of lower terminals.

10. The electrical connector of claim 9, wherein the first embedding portion and the second embedding portion of the upper insulative frame and the embedding portion of the lower insulative frame together define the air passage, the air passage penetrating the upper insulative frame.

11. The electrical connector of claim 9, wherein:

the second embedding portion of the upper insulative frame has a plurality of second recessed grooves which respectively correspond to the individual ones of the multiple upper ground terminals; and the embedding portion of the lower insulative frame has at least one third recessed groove which corresponds to the at least one lower ground terminal in position.

12. The electrical connector of claim 11, wherein:

the second recessed groove extends to a surface of the second upper held portion of the multiple upper ground terminals; and at least a part of each of two side edges of the second upper held portion of the multiple upper ground terminals is embedded in the second embedding portion of the upper insulative frame and is not exposed in the plurality of second recessed grooves.

13. The electrical connector of claim 11, wherein:

the at least one third recessed groove extends to a surface of the lower held portion of the lower ground terminal; and at least a part of each of two side edges of the lower held portion of the lower ground terminal is embedded in the embedding portion of the lower insulative frame and is not exposed in the at least one third recessed groove.

14. The electrical connector of claim 9, wherein the lower soldering portion of the lower ground terminal is used to be soldered by surface mounting technology.

15. The electrical connector of claim 9, wherein:

the upper insulative frame further has at least one upper latching portion which is formed to a top surface of the upper insulative frame and two side latching portions which are respectively formed on lower ends of two sides of the upper insulative frame;

the lower insulative frame further has at least one lower latching portion which is formed to a bottom surface of the lower insulative frame; and the insulative body has latched portions which respectively correspond to the at least one upper latching portion, the two side latching portions, and the at least one lower latching portion.

16. An electrical connector, comprising:

an insulative body;

an upper terminal module and a lower terminal module assembled with each other and provided to the insulative body;

the upper terminal module comprising an upper insulative frame having a first embedding portion and a second embedding portion;

the lower terminal module comprising a lower insulative frame having an embedding portion;

wherein the first embedding portion of the upper insulative frame positioned at a rear, the second embedding portion of the upper insulative frame positioned at a front, and the embedding portion of the lower insulative frame together define an air passage, the air passage extending from downwards to upwards, penetrating the upper insulative frame, and wherein the air passage is communicated with a plurality of grooves, and the plurality of grooves comprise a plurality of first recessed grooves recessed in the first embedding portion and respectively corresponding to individual ones of a plurality of upper ground terminals.

17. The electrical connector of claim 16, wherein the plurality of grooves further comprise at least one second recessed groove in the second embedding portion corresponding to at least one upper ground terminal.

18. The electrical connector of claim 17, wherein the plurality of grooves further comprise at least one third recessed groove in the embedding portion of the lower insulative frame corresponding to at least one lower ground terminal.

19. The electrical connector of claim 18, wherein the air passage extends from a bottom portion opening of a mounting groove of the insulative body to a rear end opening of the mounting groove positioned above the second embedding portion.

* * * * *